United States Patent
Keen et al.

(10) Patent No.: US 8,521,390 B2
(45) Date of Patent: Aug. 27, 2013

(54) ANTILOCK BRAKE SYSTEM FOR A LAND CRAFT

(75) Inventors: Steven Keen, Koblenz (DE); Josef Knechtges, Mayen (DE); Michael Schwarz, Koblenz (DE); Thorsten Valder, Montabaur (DE)

(73) Assignee: Lucas Automotive GmbH, Koblenz (DE)

(*) Notice: Subject to any disclaimer, the term of this patent is extended or adjusted under 35 U.S.C. 154(b) by 931 days.

(21) Appl. No.: 11/921,608

(22) PCT Filed: Jun. 8, 2006

(86) PCT No.: PCT/EP2006/005489
§ 371 (c)(1),
(2), (4) Date: May 19, 2009

(87) PCT Pub. No.: WO2006/131365
PCT Pub. Date: Dec. 14, 2006

(65) Prior Publication Data
US 2009/0306870 A1 Dec. 10, 2009

(30) Foreign Application Priority Data
Jun. 9, 2005 (DE) .................. 10 2005 026 738

(51) Int. Cl.
*B60T 8/17* (2006.01)
*B60T 8/171* (2006.01)
*B60T 8/40* (2006.01)
*G06F 17/00* (2006.01)
*G06F 19/00* (2011.01)

(52) U.S. Cl.
USPC ............. 701/71; 303/115.2; 303/116.1

(58) Field of Classification Search
USPC ... 701/70, 71, 1, 36, 45, 48, 29.1; 303/113.1, 303/113.2, 114.1, 114.2, 115.2–115.4, 116.1, 303/116.2
See application file for complete search history.

(56) References Cited

U.S. PATENT DOCUMENTS

| | | | |
|---|---|---|---|
| 5,281,014 A | 1/1994 | Volz | |
| 5,445,445 A * | 8/1995 | Yukio | 303/113.5 |
| 5,586,814 A * | 12/1996 | Steiner | 303/116.2 |
| 6,102,493 A * | 8/2000 | Schmitt | 303/116.1 |
| 7,174,247 B2 | 2/2007 | Gronau et al. | |

FOREIGN PATENT DOCUMENTS

| | | |
|---|---|---|
| DE | 37 31 603 A1 | 5/1988 |
| WO | WO 91/05686 | 5/1991 |
| WO | WO 03/082645 A1 | 10/2003 |
| WO | WO 2006/029979 A1 | 3/2006 |

* cited by examiner

*Primary Examiner* — Thomas Tarcza
*Assistant Examiner* — Edward Pipala
(74) *Attorney, Agent, or Firm* — MacMillan, Sobanski & Todd, LLC

(57) ABSTRACT

Hydraulic brake system and method for controlling a hydraulic brake system for a land craft, in which a quantity of hydraulic fluid delivered to wheel brakes during pressure build-up phases in antilock braking mode is limited so that substantially no hydraulic fluid thereof can flow to a master cylinder.

4 Claims, 2 Drawing Sheets

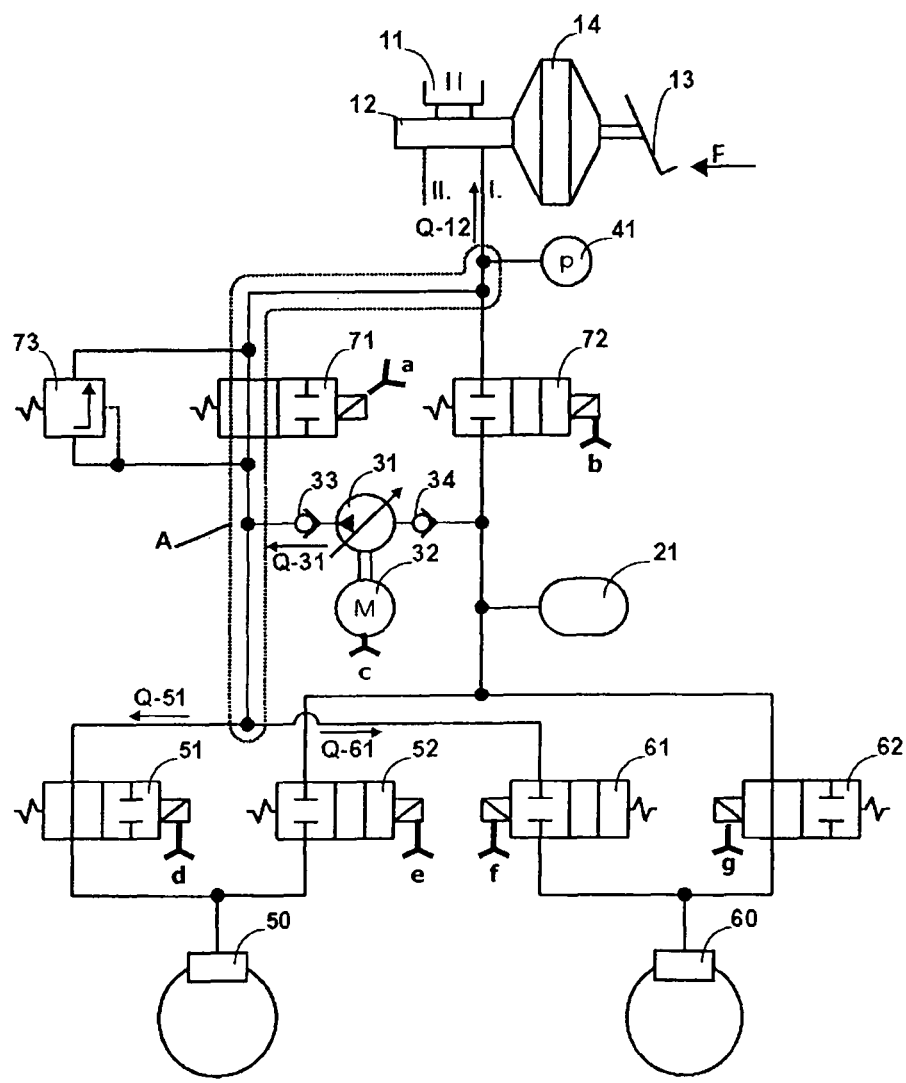
Fig. 2
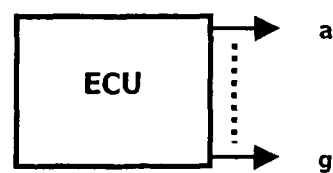

ANTILOCK BRAKE SYSTEM FOR A LAND CRAFT

CROSS-REFERENCE TO RELATED APPLICATIONS

This application is a National stage of International Application No. PCT/EP2006/005489 filed Jun. 8, 2006, which claimed priority to German Patent Application No. 10 2005 026 738.6 filed Jun. 9, 2005, the disclosures of both are incorporated herein by reference.

BACKGROUND OF THE INVENTION

The present invention relates in general to brake systems for land craft and in particular a brake system with antilock braking.

Hydraulic brake systems for land craft can be adapted to carry out, in addition to braking actions controlled by the driver, automatic braking actions which take place independently of an actuation of the brake system by the driver. Examples of automatic braking actions of this kind include braking actions for a traction control system (TCS), which prevent individual wheels from spinning when starting to drive through specifically braking the corresponding wheels, for dynamic stability control, in the case of which the vehicle behaviour is controlled within limits through specifically braking individual wheels, and for adaptive speed control, in the case of which, for example, predetermined speeds and/or distances from vehicles in front are observed through automatic braking of the vehicle.

It is usual, both with regard to braking actions controlled by the driver and with regard to automatic braking actions, to provide antilock braking in order to prevent wheels from locking during a braking action. In antilock braking mode the brake pressure in a wheel brake of a hydraulic brake system is modulated when locking or incipient locking of a corresponding wheel is ascertained. The brake pressure modulation takes place through pressure build-up, pressure maintaining and pressure reduction phases which alternate in a time sequence.

A problem in this respect lies in the fact that, in the case of braking actions controlled by the driver, hydraulic fluid in a master cylinder of a hydraulic brake system is generally caused to oscillate when carrying out antilock braking. This can lead to disturbing noises and to pulsating movements, corresponding to the oscillations, of a brake pedal which is provided to actuate the master cylinder.

BRIEF SUMMARY OF THE INVENTION

The object of the invention is to at least partly compensate for disturbing effects on account of antilock braking carried out by a hydraulic brake system.

The present invention provides a brake system and a method according to the independent claims in order to achieve the above object.

The hydraulic brake system according to the invention is intended for a land craft and comprises a control unit which is adapted to provide at least control signals for operating the brake system for antilock braking.

Here and in the following the term "adapted" is to be understood as meaning that the control unit is designed at least structurally in order to provide the respective indicated technical functional features. Moreover, the control unit can also be programmed in order to provide the respective indicated technical functional features, for example using software code or computer programs. The functions of the control unit are thus provided by a corresponding hardware structure (e.g. ASIC). The control unit can also be designed so that it has a hardware structure which can also be generally used and which, in conjunction with corresponding programming (e.g. permanently implemented software code, computer program provided on a computer-readable storage medium, for operating downloadable software code or a computer program), provides the technical functional features of the control unit.

The brake system according to the invention also comprises a master cylinder in order to generate brake pressure under the control of a driver or by actuating a brake pedal. Also provided is a first brake circuit with at least one wheel brake and a first controllable pump in order to enable hydraulic fluid to be supplied in a controlled manner to the at least one wheel brake of the first brake circuit. The brake system also has a first fluid connection between the outlet side of the first pump and the master cylinder.

According to the invention, the control unit is adapted to establish a first hydraulic fluid quantity which, for hydraulic fluid delivered by the first pump during a pressure build-up phase in antilock braking mode, represents a limit such that a flow of hydraulic fluid via the first fluid connection from the outlet side of the first pump to the master cylinder is substantially prevented.

In one preferred embodiment the brake system comprises a second brake circuit with at least one wheel brake and a second controllable pump for supplying hydraulic fluid in a controlled manner to the at least one wheel brake of the second brake circuit and a second fluid connection between the outlet side of the second pump and the master cylinder. In this case the control unit can establish a second hydraulic fluid quantity which limits the hydraulic fluid delivery of the second pump during a pressure build-up phase in antilock braking mode so that a flow of hydraulic fluid via the second fluid connection from the outlet side of the second pump to the master cylinder is substantially prevented.

The control unit is preferably also adapted to provide control signals in order to limit the quantity of hydraulic fluid delivered by the first pump during a pressure build-up phase in antilock braking mode to the first hydraulic fluid quantity.

The brake system can in this case comprise a first motor for driving the first pump, and the control unit can be adapted to control the first motor so that the hydraulic fluid delivery of the first pump is limited to the first hydraulic fluid quantity.

The control unit can provide control signals in order to limit the quantity of hydraulic fluid delivered by the second pump during a pressure build-up phase in antilock braking mode to the second hydraulic fluid quantity.

If the brake system in this case has a second motor for driving the second pump, the control unit can be adapted to operate the second motor so that the second pump only delivers the second hydraulic fluid quantity.

In an embodiment comprising two brake circuits for which the first and second hydraulic fluid quantities are established, the control unit can establish, on the basis thereof, a common hydraulic fluid quantity which, if the delivery of each pump of the brake circuits is in each case limited to the common hydraulic fluid quantity, substantially prevents a flow of hydraulic fluid via the corresponding fluid connection from the outlet side of the corresponding pump to the master cylinder, at least for one of the brake circuits.

In this case the common hydraulic fluid quantity preferably corresponds to the average value of the first and second hydraulic fluid quantities.

When using a common hydraulic fluid quantity, the brake system can have a motor which serves to drive both pumps of the brake circuits. In this case the control unit can adjust the motor so that the delivery of each pump is limited to the common hydraulic fluid quantity.

The control unit is preferably also adapted in order to prevent hydraulic fluid from being supplied to the corresponding wheel brake(s) using the pump(s) during a pressure maintaining phase and/or a pressure reduction phase in antilock braking mode. Here the control unit in particular stops the pump(s) in such antilock braking phases.

The method according to the invention is intended for controlling a hydraulic brake system of a land craft which permits antilock braking and comprises a master cylinder for generating brake pressure under the control of a driver and a first brake circuit with at least one wheel brake. In the method according to the invention the above-mentioned first hydraulic fluid quantity is established when antilock braking is carried out during a braking action controlled by the driver.

The above-mentioned second hydraulic fluid quantity is established when using the method according to the invention for controlling a brake system with a second brake circuit comprising at least one wheel brake.

Moreover, with regard to at least one brake circuit, the wheel brake(s) thereof is/are supplied with the first or second hydraulic fluid quantity during a pressure build-up phase.

Alternatively, on the basis of the first and second hydraulic fluid quantities, a common hydraulic fluid quantity is established which can in each case be supplied to the at least one wheel brake of the brake circuits.

Other advantages of this invention will become apparent to those skilled in the art from the following detailed description of the preferred embodiments, when read in light of the accompanying drawings.

BRIEF DESCRIPTION OF THE DRAWINGS

FIG. 2 is a schematic representation of the brake system of FIG. 1 in an operating state with antilock braking.

DETAILED DESCRIPTION OF THE INVENTION

Figure 1:
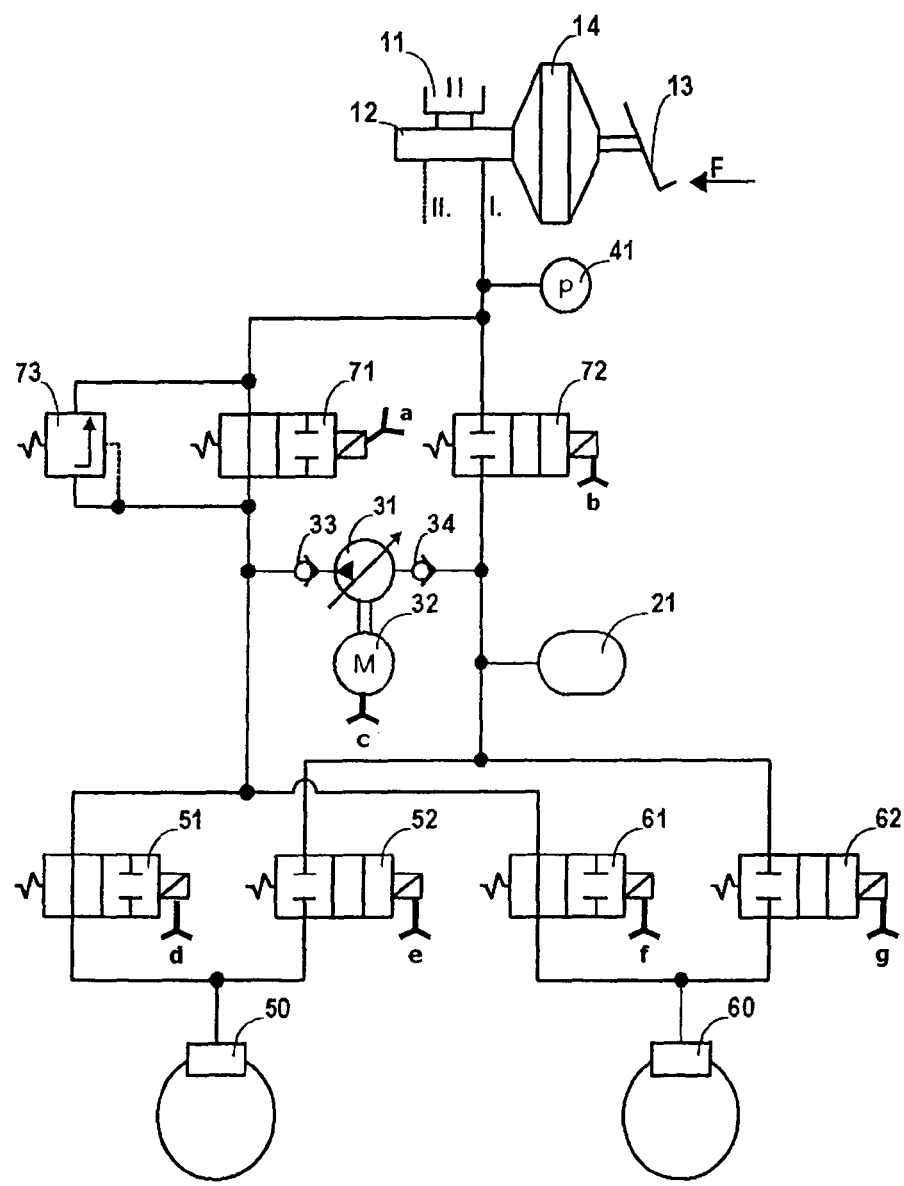
FIG. 1 is a schematic representation of a brake system according to the invention in an operating state for braking actions which are controlled at least partly by the driver.
Figure 1:
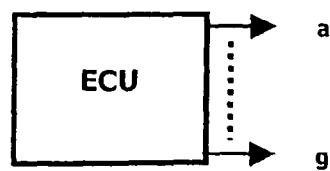

FIGS. 1 and 2 are schematic representations of brake systems. The following statements with reference to the embodiment of FIG. 1 also apply accordingly to the embodiment of FIG. 2.

The brake system works by means of hydraulic fluid, which is stored in part in a reservoir 11. A master cylinder 12, which can be actuated by the driver through a pedal 13, serves to generate brake pressure, which is produced by pressurising the hydraulic fluid. As represented in the figures, a brake booster 14 disposed between the master cylinder 12 and the pedal 13 can optionally be provided in order to boost a force F introduced by the driver—preferably pneumatically or hydraulically.

A first and second brake circuit I., II. are supplied from the master cylinder 12, wherein each brake circuit comprises two wheel brakes. According to which wheel brakes of the vehicle are comprised by which brake circuit, there is a division between the front and rear axle, wherein one brake circuit can comprise wheel brakes of the front axle and the other brake circuit can comprise wheel brakes of the rear axle or one brake circuit can comprise the wheel brake of a front wheel and the wheel brake of the rear wheel lying diagonally opposite and the other brake circuit can comprise the wheel brakes of the other front wheel and of the other rear wheel.

It is assumed in the following that the brake circuits I. and II. are composed in a substantially identical manner. Therefore only the brake circuit I is shown in detail. The following statements with reference to the brake circuit I. apply accordingly to the brake circuit II.

The brake circuit I. comprises two wheel brakes 50 and 60. A first valve arrangement comprising valves 51 and 52 and a second valve arrangement comprising valves 61 and 62 are provided to control brake pressure variations in the wheel brakes 50 and 60.

Here the valves 51, 52, 61 and 62 are represented as 2/2-way valves which can be actuated by electromagnets.

The brake circuit I. comprises a valve device having valves 71, 72 and 73. Here the valves 71 and 72 are represented as 2/2-way valves which can be actuated by electromagnets.

FIG. 1 shows the valves 51, 61 and 71 in each case in an open operating state or throughflow position, while the valves 52, 62 and 72 are in each case shown in a closed operating state or blocking position. These operating states or positions are also called basic position in the following.

On account of the open operating state of the valve 71, in the operating state of the brake circuit I. which is represented in FIG. 1 there is a hydraulic connection between the master cylinder 12 and the wheel brakes 50 and 60. This operating state is used for braking actions which can be controlled via actuations of the pedal 13 and which can also be called normal braking actions. Actuations of the master cylinder 12 by means of the pedal 13, optionally with the co-operation of the brake booster 14, generate brake pressures in the brake circuit I. and therefore in the wheel brakes 50 and 60.

The brake system which is shown is designed for so-called antilock braking, in the case of which locking of the wheels is to be prevented during a braking action. Brake pressures acting in the wheel brakes 50 and 60 are individually modulated for this purpose. This takes place by adjusting pressure build-up, pressure maintaining and pressure reduction phases which alternate in a time sequence and are explained in greater detail in the following.

The pressure build-up, maintaining and reduction phases are attained through appropriate control of the valves 51, 52 and 61, 62, respectively, associated with the wheel brakes 50 and 60, by means of an electronic control unit ECU.

The electronic control unit ECU can receive signals indicating operating stats of a vehicle via a number of inputs, which are not represented. For example, signals from wheel speed sensors, yaw velocity sensors, lateral acceleration sensors, etc. are supplied to the electronic control unit ECU.

The electronic control unit ECU has outputs for control signals a, . . . , g for controlling the valves 51, 52, 61, 62, 71 and 72 as well as for controlling a motor 32 which is provided to operate a pump 31.

In the case of a driver-controlled normal braking action with antilock braking, the control takes place through the electronic control unit ECU in accordance with measured quantities which indicate operating states of the vehicle (e.g. speed, acceleration, wheel speeds, yaw velocity, lateral acceleration, etc.) and measured quantities which indicate a braking action desired by the driver (e.g. actuation of the pedal 13, hydraulic pressure at the outlet of the master cylinder 12, etc.). The braking action desired by the driver can also be established via the brake pressure P which is generated in the master cylinder 12 and for the detection of which a sensor 41 is provided.

During a normal braking action without antilock braking the valves 51, 52 and 61, 62 are in each case in their basic positions. If the electronic control unit ECU ascertains that wheels associated with the wheel brakes 50 and 60 are tending to lock or are locking, the electronic control unit ECU effects a pressure maintaining phase in each case for the wheel brakes 50 and 60. If the incipient locking or locking is not terminated as a result of the pressure maintaining phases, the electronic control unit ECU effects a pressure reduction phase in each case for the wheel brakes 50 and 60 until the incipient locking or locking is terminated. This is followed by pressure build-up phases for the wheel brakes 50 and 60 under the control of the electronic control unit ECU, in which phases the brake pressures acting in the wheel brakes 50 and 60 are built up according to the braking action desired by the driver.

During the pressure maintaining phases the valves 51 and 61 are in each case brought into a closed operating position or blocking position under the control of the electronic control unit ECU. The valves 52 and 62 then remain in their basic positions occupied in a normal braking action.

The closure of the valves 51 and 61 leads to hydraulic decoupling of the wheel brakes 50 and 60, whereby the brake pressures acting in the wheel brakes 50 and 60 are maintained constant.

During the pressure reduction phases the valves 51 and 61 are maintained in their closed operating positions and the valves 52 and 62 are activated by the electronic control unit ECU so that they in each case assume an open operating state or throughflow position. On account of the open valves 52 and 62, hydraulic fluid can flow off out of the wheel brakes 50 and 60, whereby the brake pressures acting in the wheel brakes 50 and 60 are reduced. Hydraulic fluid then flowing off can be temporarily stored in a low-pressure store 21.

During a pressure build-up phase the valves 51, 52 and 61 and 62 take up their basic positions, which means that the valves 51 and 61 are opened by the electronic control unit ECU, while the valves 52 and 62 are closed. In order to increase the brake pressures in the wheel brakes 50 and 60 which are reduced in the pressure reduction phases, the electronic control unit ECU activates the motor 32 and therefore the pump 31 so that the brake pressures acting in the wheel brakes 50 and 60 are increased via the valves 51 and 61 to the level which corresponds to the braking action desired by the driver. The pump 31 then returns hydraulic fluid which has flowed off in the pressure reduction phases, optionally from the low-pressure store 21.

The pump 31, which is designed, for example, as a radial piston pump, blocks in the direction opposite to its direction of delivery, for example by means of a check valve 33 at the outlet of the pump 31 and a check valve 34 at the inlet of the pump 31.

The speed of the electric motor 32 can be adjusted or regulated via the control signal c of the electronic control unit ECU, whereby the delivery of the pump 31 can be controlled. The electric motor 32 can at the same time activate a pump, which is not shown here, of the second brake circuit II.

In the case of the brake system according to FIG. 1 it is possible for hydraulic fluid in the master cylinder 12 to be caused to oscillate when carrying out antilock braking in the event of a braking action which is controlled by the driver and upon which hydraulic fluid in the master cylinder 12 is pressurised by actuating the pedal 13. The noises and pulsating movements of the pedal 13, resulting through the reaction of hydraulic fluid in the master cylinder 12 on the pedal 13, which may then arise can be unpleasant and irritating for the driver and lead to undesirable driver reactions and critical driving conditions resulting therefrom.

The reason for this can be seen in the fact that hydraulic fluid delivered by the pump 31 can flow in part to the master cylinder 12 during a pressure build-up phase when carrying out antilock braking. A flow of this kind of hydraulic fluid to the master cylinder 12 can produce forces, the forces produced by the driver, which are exerted via the pedal 13 on hydraulic fluid in the master cylinder 12, are opposite or superimposed on these.

In order to solve this problem, according to the invention, during a pressure build-up phase in antilock braking mode, using the pump 31, no more hydraulic fluid is generally delivered than is necessary in order to again supply the quantity of hydraulic fluid carried away from the wheel brakes during a previous pressure reduction phase. In particular, during a pressure build-up phase in antilock braking mode, the pump 31 delivers substantially exactly the quantity of hydraulic fluid which generates pressures in the wheel brakes which provide the braking effect desired by the driver and predetermined by means of the pedal 13, but no more.

The delivery of the pump 31 during pressure build-up phases in antilock braking mode is in particular controlled so that substantially no quantity of hydraulic fluid delivered by the pump 31 which can flow from the outlet side of the pump 31 to the master cylinder 12 is "excess". This can be achieved through corresponding control of the electric motor 32 by the control unit ECU by, for example, adjusting and/or regulating the speed of the motor 32 in order to operate the pump 31 to deliver such a quantity of hydraulic fluid.

Since hydraulic fluid which is delivered by the pump 31 is prevented from being able to flow to the master cylinder during a pressure build-up phase, the above-mentioned problems are avoided. An additional advantage can be seen in the fact that hydraulic fluid can be stored in the pressure store 21 such that the pump 31 can be operated with low noise levels, in particular with antilock braking of relatively long duration.

Referring to FIG. 2, preferred embodiments are described in the following, only the brake circuit I. being referred to for the sake of simplicity. It is understood that the following statements also apply accordingly to the brake circuit II.

FIG. 2 shows the brake system in an operating state in which brake pressure is built up in the master cylinder 12 by actuating the pedal 13, optionally with the assistance of the brake booster 14. In this operating state for a braking action which is controlled by the driver the valve 71 is open in order to establish a hydraulic connection between the master cylinder 12 and the wheel brakes 50 and 60. This hydraulic connection also provides a fluid connection between the outlet side of the pump 31 and the master cylinder 12. The valve 72 is closed in order to prevent a flow of hydraulic fluid from the outlet sides of the wheel brakes 50 and 60 to the master cylinder 12.

As stated above, the brake system carries out antilock braking when locking or incipient locking for at least one of the wheel brakes 50 and 60 or wheels associated with these is detected. As likewise stated above, the antilock braking takes place through pressure build-up, pressure maintaining and pressure reduction phases which alternate in a time sequence.

FIG. 2 shows the brake system in an operating state in which there is a pressure build-up phase for the wheel brake 50 when carrying out antilock braking. The valve 51 is open to build up pressure for the wheel brake 50 in order to supply hydraulic fluid delivered by the pump 31 to the wheel brake 50 via the inlet side thereof. The valve 52 is closed in order to prevent a flow of hydraulic fluid from the wheel brake 50 at the outlet side thereof in the direction of the inlet side of the pump 31.

The following relation for hydraulic fluid is obtained at the outlet side of the pump 31 at the location of the brake system which is marked by the reference character A:

$Q\text{-}31=Q\text{-}12+Q\text{-}51+Q\text{-}61$

Here Q-31 indicates the quantity of hydraulic fluid which is delivered by the pump 31, Q-12 indicates the quantity of hydraulic fluid which flows from the outlet side of the pump 31 to the master cylinder 12, Q-51 indicates the quantity of hydraulic fluid which flows from the outlet side of the pump 31 to the wheel brake 50 and Q-61 indicates the quantity of hydraulic fluid which is delivered by the pump 31 to the wheel brake 60.

In the operating state which is represented in FIG. 2 a pressure reduction phase is carried out for the wheel brake 60, for which purpose the valve 61 is closed and the valve 62 is open. The pump 31 accordingly supplies no hydraulic fluid to the wheel brake 60, i.e. Q-61=0. This also applies to an operating state of the brake system which is not represented and in which a pressure maintaining phase is carried out for the wheel brake 60 in which the valves 61 and 62 are closed.

In order to prevent hydraulic fluid which is delivered by the pump 31 from flowing to the master cylinder 12 during the pressure build-up phase for the wheel brake 50, i.e. Q-12=0, the pump 31 is operated by controlling the motor 32 accordingly so that the quantity Q-31 of hydraulic fluid which is delivered by the pump 31 corresponds to the hydraulic fluid quantity Q-51 (Q-31=Q-51). The quantity Q-31 of the pump 31 therefore provides the quantity of hydraulic fluid which corresponds to the (renewed) pressure build-up in the wheel brake 50 to a pressure which corresponds to a braking effect which is predetermined by actuating the pedal 13 and desired by the driver.

In order to establish the quantity Q-31 of hydraulic fluid which is to be delivered by the pump 31, the control unit ECU can, for example, use algorithms, characteristics, parameters of the brake system which are employed in antilock braking, such as, for example, dimensions of components carrying hydraulic fluid (e.g. fluid lines, valves, etc.) and receiving capacities or volumetric capacities of the wheel brakes.

The above statements with regard to the wheel brake 50 apply accordingly to a pressure build-up phase for the wheel brake 60 in antilock braking mode when a pressure reduction phase or a pressure maintaining phase is carried out for the wheel brake 50. The pump 31 is accordingly operated so that the delivery Q-31 thereof corresponds to the quantity Q-61 of hydraulic fluid which is to be supplied to the wheel brake 60 (Q-31=Q-61), as no hydraulic fluid is supplied to the wheel brake 50 (Q-51=0).

If pressure build-up phases are carried out during antilock braking for both wheel brakes 50 and 60, the pump 31 is controlled so that its delivery Q-31 of hydraulic fluid corresponds to the sum of the hydraulic fluid quantities which are to be supplied to the wheel brakes 50 and 60 (Q-31=Q-51+Q-61).

If pressure maintaining phases and/or pressure reduction phases are carried out instead of pressure build-up phases during antilock braking for both wheel brakes 50 and 60, the pump 31 is controlled so that it does not deliver any hydraulic fluid (Q-31=0).

The above statements with regard to the brake circuit I. apply accordingly to the brake circuit II. If the motor 32 serves to operate both the pump 31 of the brake circuit I. and a corresponding pump of the brake circuit II., it is likewise possible to substantially prevent hydraulic fluid which is delivered by the pumps to flow to the master cylinder 12 in pressure build-up phases during antilock braking.

In this respect the control unit ECU establishes for the brake circuit I. a quantity Q-31-I of hydraulic fluid which is to be delivered by the pump 31 and for the brake circuit II. a quantity Q-31-II of hydraulic fluid which is to be delivered by the pump thereof. Taking the deliveries Q-31-I and Q-31-II as a basis, the control unit ECU then establishes how the motor 32 is to be controlled in order to operate the pumps of the brake circuits I. and II. so that a flow of hydraulic fluid delivered by the pumps to the master cylinder 12 is substantially prevented. In this respect the control unit ECU can, for example, establish a common, average quantity Q-31-M which corresponds to the average value of the quantities Q-31-I and Q-31-II (Q-31-M=(Q-31-I+Q-31-II)/2). The motor 32 is then controlled by the control unit ECU so that both pumps deliver the common, average quantity Q-31-M. In the case of the common quantity Q-31-M assumed here, a flow of hydraulic fluid delivered by a pump to the master cylinder 12 is prevented, at least for the brake circuit for whose pump an individual delivery (Q-31-I or Q-31-II) which is greater than the common quantity Q-31-M has been established.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:
1. Hydraulic brake system for a land craft, with
a control unit which is adapted to provide control signals for operating the brake system for antilock braking,
a master cylinder for generating brake pressure under the control of a driver,
a first brake circuit and a second brake circuit with
at least one wheel brake in each case, and
a first controllable pump for supplying hydraulic fluid in a controlled manner to the at least one wheel brake of the first brake circuit, and
a second controllable pump for supplying hydraulic fluid in a controlled manner to the at least one wheel brake of the second brake circuit,
a first fluid connection between the outlet side of the first pump and the master cylinder, and
a second fluid connection between the outlet side of the second pump and the master cylinder, in which
the control unit is adapted to establish a first hydraulic fluid quantity for limiting a quantity of hydraulic fluid to be delivered by the first pump for a pressure build-up phase in antilock braking mode which substantially prevents a flow of hydraulic fluid from the outlet side of the first pump via the first fluid connection to the master cylinder,
the control unit is adapted to establish a second hydraulic fluid quantity for limiting a quantity of hydraulic fluid to be delivered by the second pump for a pressure build-up phase in antilock braking mode which substantially prevents a flow of hydraulic fluid from the outlet side of the second pump via the second fluid connection to the master cylinder,
the control unit is adapted to establish, by averaging the first hydraulic fluid quantity and the second hydraulic fluid quantity, a common hydraulic fluid quantity which, for at least one of the first and second brake circuits, substantially prevents a flow of hydraulic fluid from the outlet side of the corresponding pump via the respective fluid connection to the master cylinder,
one motor is provided for driving the first and the second pump, and
the control unit is adapted to provide control signals for the motor in order to limit the quantity of hydraulic fluid in each case delivered by the first and the second pump to the common hydraulic fluid quantity.

2. Brake system according to claim 1, in which the control unit is adapted to establish the at least one hydraulic fluid quantity on the basis of at least one of the following parameters:
   at least one flow cross section of the corresponding brake circuit, and
   a receiving capacity of the at least one wheel brake of the corresponding brake circuit for hydraulic fluid.

3. Brake system according to any one of the preceding claims, in which the control unit is adapted to provide control signals in order to prevent hydraulic fluid from being supplied by means of the at least one pump during at least one pressure maintaining phase and one pressure reduction phase in antilock braking mode.

4. Method for controlling a hydraulic brake system with antilock braking for a land craft, which system comprises a master cylinder for generating brake pressure under the control of a driver and a first brake circuit with at least one wheel brake, and a second brake circuit with at least one wheel brake, comprising the following steps:
   carrying out antilock braking by means of the brake system during a braking action controlled by the driver,
   establishing a first hydraulic fluid quantity which determines a quantity of hydraulic fluid to be delivered to the at least one wheel brake of the first brake circuit during a pressure build-up phase in antilock braking mode so that a flow of hydraulic fluid from the first brake circuit to the master cylinder is substantially prevented,
   establishing a second hydraulic fluid quantity which determines a quantity of hydraulic fluid to be delivered to the at least one wheel brake of the second brake circuit during a pressure build-up phase in antilock braking mode so that a flow of hydraulic fluid from the second brake circuit to the master cylinder is substantially prevented,
   establishing, on the basis of the first hydraulic fluid quantity and the second hydraulic fluid quantity, by averaging the first hydraulic fluid quantity and the second hydraulic fluid quantity, a common hydraulic fluid quantity which substantially prevents a flow of hydraulic fluid from at least one of the first and second brake circuits to the master cylinder,
   driving a first pump in the first brake circuit and a second pump in the second brake circuit with one motor based on the common hydraulic quantity, and
   supplying the common hydraulic fluid quantity in each case to the at least one wheel brake of the first brake circuit and the at least one wheel brake of the second brake circuit during a pressure build-up phase in antilock braking mode.

* * * * *